(12) United States Patent
Balk et al.

(10) Patent No.: US 9,227,723 B2
(45) Date of Patent: Jan. 5, 2016

(54) MECHANISM FOR VARIABLE ADJUSTMENT OF BLADES FOR A SYSTEM OF CONTRA-ROTATING PROPELLERS, AND A SYSTEM OF CONTRA-ROTATING PROPELLERS COMPRISING AT LEAST ONE SUCH MECHANISM

(75) Inventors: Wouter Balk, Melun (FR); Gilles Alain Charier, La Grande Paroisse (FR)

(73) Assignee: SNECMA, Paris (FR)

( * ) Notice: Subject to any disclaimer, the term of this patent is extended or adjusted under 35 U.S.C. 154(b) by 764 days.

(21) Appl. No.: 13/635,048

(22) PCT Filed: Mar. 15, 2011

(86) PCT No.: PCT/EP2011/053866
§ 371 (c)(1),
(2), (4) Date: Sep. 25, 2012

(87) PCT Pub. No.: WO2011/113821
PCT Pub. Date: Sep. 22, 2011

(65) Prior Publication Data
US 2013/0011259 A1     Jan. 10, 2013

(30) Foreign Application Priority Data
Mar. 15, 2010   (FR) ...................... 10 51829

(51) Int. Cl.
*B64C 11/32*   (2006.01)
*B64C 11/30*   (2006.01)
*F01D 7/00*    (2006.01)
*B64D 27/00*   (2006.01)

(52) U.S. Cl.
CPC ................ *B64C 11/306* (2013.01); *F01D 7/00* (2013.01); *B64D 2027/005* (2013.01); *F05D 2250/12* (2013.01); *F05D 2250/232* (2013.01); *Y02T 50/66* (2013.01); *Y02T 50/671* (2013.01)

(58) Field of Classification Search
CPC ...... B64C 11/306; B64C 11/30; B64C 11/32; B64C 11/36; B64C 11/38; B64C 11/42; B64C 11/46; B64C 11/48; F01D 7/00
See application file for complete search history.

(56) References Cited

U.S. PATENT DOCUMENTS

| 3,869,221 A | 3/1975 | Wildner |
| 4,657,484 A | 4/1987 | Wakeman et al. |
| 4,842,484 A | 6/1989 | Johnson |
| 2012/0099987 A1* | 4/2012 | Belmonte et al. ....... B64C 11/32 416/34 |

OTHER PUBLICATIONS

International Search Report issued Jun. 17, 2011 in PCT/EP2011/053866. French Preliminary Search Report issued Nov. 17, 2010 in French Patent Application No. 1051829 filed Mar. 15, 2010 (with English Translation of Categories of Cited Documents).
U.S. Appl. No. 14/164,827, filed Jan. 27, 2014, Hugon, et al.

* cited by examiner

*Primary Examiner* — Richard Edgar
(74) *Attorney, Agent, or Firm* — Oblon, McClelland, Maier & Neustadt, L.L.P.

(57) ABSTRACT

A mechanism for adjusting pitch of blades of a propeller of a system of contra-rotating propellers for a turbomachine, wherein each blade moves around a radial axis. The mechanism includes a linear actuator, a structure to transform movement imparted by the linear actuator into rotation of each of the blades in a synchronized manner around their radial axis, the structure including a bracket of longitudinal axis formed of a central ring, an outer ring, and multiple radial arms rigidly connected to the central ring and to the outer ring. The central ring can be subject to actuation of the linear actuator, and the central ring and the outer ring are positioned in two separate planes, orthogonal to the longitudinal axis, such that the bracket is shaped as a truncated cone.

16 Claims, 10 Drawing Sheets

MECHANISM FOR VARIABLE ADJUSTMENT OF BLADES FOR A SYSTEM OF CONTRA-ROTATING PROPELLERS, AND A SYSTEM OF CONTRA-ROTATING PROPELLERS COMPRISING AT LEAST ONE SUCH MECHANISM

TECHNICAL FIELD AND PRIOR ART

The present invention relates to a mechanism for variable adjustment of the pitch of blades for contra-rotating propellers, a system of contra-rotating propellers comprising at least one such variable adjustment mechanism, and to a turbomachine comprising such a system.

In the state of the art, turbomachines with systems of contra-rotating propellers are known, the propellers of which are driven by a mechanical transmission system, habitually taking the form of a differential reduction gear.

Each of the first and second propellers comprises a hub centred on the longitudinal axis, an outer ferrule which is positioned concentrically in relation to it, and which contributes to the radial delimitation towards the exterior of a principal annular airstream of the turbomachine's gas stream, together with connecting arms connecting the outer ferrule to the hub.

In addition, the system with contra-rotating propellers comprises a mechanism for variable adjustment of the pitch of each blade of both propellers to adjust the angular alignment of the blades to suit each flight condition, and to generate a reverse thrust after landing in order to slow the aircraft.

Such mechanisms are known in the state of the art. A variable adjustment mechanism exists which comprises a hydraulic cylinder positioned on the drive shaft; this actuator imparts motion to racks engaging with radial shafts. The radial shafts traverse the hot airstream and impart motion to gears located outside the engine. The gears are in their turn connected to the roots of the propeller blades.

This mechanism is not very rigid, making it difficult to keep the blades aligned at the desired angle. In addition, the gears are located outside the engine and are therefore exposed to the ambient conditions without lubrication. Their lifetime is then directly impacted, and maintenance costs are increased. Another mechanism has also been proposed; this, to compensate for the poor rigidity of the previously described mechanism, comprises a large number of gears and an epicyclic reducing gear in each blade pivot. The high gear ratio between the driving engine and the blade leads to improved accuracy and rigidity. Conversely, the mechanism is very complex, with high mass and cost price.

It is consequently one aim of the present invention to provide a mechanism for variable adjustment of the blades of the contra-rotating propellers, allowing improved control of the angular alignment of the blades, whilst being particularly reliable and of relatively simple construction.

DESCRIPTION OF THE INVENTION

The above-stated aim is attained through a mechanism for adjusting the blades of at least one propeller comprising a linear actuator, and means to transform the movement of the actuator into a rotation of the blades, where said means comprise a bracket fitted with multiple arms, and where the bracket has the rough shape of a truncated cone. Due to its conical shape the bracket is very rigid, thus allowing accurate adjustment of the angular position of the blades, and enabling them to be kept in position. In addition, the bracket has a very open-worked structure, which reduces the negative impact of its presence on the hot gas stream.

In an advantageous example, the arms of the bracket are housed in hollow connecting arms connecting an outer ferrule to the hub of the contra-rotating propellers, where the connecting arms form a fairing for the arms of the bracket, which also has the effect of reducing the negative impact of the presence of the bracket in the gas stream.

In a particularly advantageous manner, the connecting arms are inclined, enabling the blades to be brought close to the casing, and consequently enabling the length of the system of propellers in the axial direction to be reduced. This results in an improvement in terms of mass and encumbrance.

The mechanism according to the present invention is at once sufficiently rigid to modify the pitch of the propellers with the desired accuracy, reliable, simple and safe, leading to less blocking of the gas stream.

The subject-matter of the present invention is then mainly a mechanism for adjusting the pitch of the blades of at least one propeller of a system of contra-rotating propellers for a turbomachine, where each blade rotates around a radial axis, where said mechanism comprises a linear actuator, and means to transform the movement delivered by the linear actuator into the rotation of each of said blades in a synchronised manner around their radial axis, where said means comprise a bracket of longitudinal axis fitted with a central ring, an external ring and multiple radial arms rigidly connected to the central ring and to the external ring, where said central ring is intended to be subjected to the actuation of the linear actuator, where said central ring and said external ring are positioned in two separate planes, orthogonal to the longitudinal axis, such that said radial arms are inclined relative to the longitudinal axis, and where the bracket then has the shape of a truncated cone.

Advantageously, the external ring is polygonal in shape. For example, the external ring can be formed from multiple straight segments, each extending between two radially external ends of two consecutive radial arms.

In an example embodiment, the means to transform the movement of the linear actuator into the rotation of each of said blades comprise connecting rods hinged between the bracket and each blade, where the hinge between the connecting rod and the blade is a pivot linkage of axis parallel to the radial axis of rotation of said blade, but different to said radial axis.

Advantageously, the mechanism according to the present invention comprises counterweights, associated with each of the blades, designed to return the blades to their feathered position.

The linear actuator is, for example, a hydraulic cylinder.

Another subject-matter of the present invention is a system of contra-rotating propellers for an aircraft turbomachine, comprising:

a free power turbine, a contra-rotating first contra-rotating blade and second contra-rotating blade, designed to be made to rotate around a longitudinal axis of the system of propellers, where said first propeller is located in a given direction relative to said second propeller, where each of the first and second propellers comprises a hub centred on the longitudinal axis, and where an outer ferrule is positioned concentrically relative to it, and contributes to the radial delimitation towards the outside of a principal annular airstream, together with connecting arms connecting said outer ferrule to said hub, a mechanical transmission device driven by said free power turbine and driving said first and second propellers, a first mechanism for adjusting the pitch of the blades of the first turbine, and a second mechanism for adjusting the pitch of the blades of the second turbine, where at least one of the first and second adjustment mechanisms is a mechanism according to the present invention.

The connecting arms are advantageously hollow, and the radial arms are housed in the connecting arms. In a preferred manner, the bracket comprises as many radial arms as there are blades, where each radial arm is accommodated in a connecting arm.

The connecting arms are advantageously contained in planes which do not contain the longitudinal axis, such that the connecting arms are aligned with the flow of the gas in the principal airstream, and where the adjustment mechanism comprises means to guide the bracket, such that it describes a helical motion around the longitudinal axis. In an example embodiment, the adjustment mechanism according to the invention comprises a synchronisation ring connected to the inner ring of the bracket by multiple connecting rods, and the guide means comprise multiple rectilinear grooves parallel to the longitudinal axis, to guide the synchronisation ring, and multiple helical grooves, to guide the central ring.

In a particularly advantageous example, the connecting arms of the first propeller and the connecting arms of the second propeller extend radially in planes containing the longitudinal axis, in directions which are inclined relative to the longitudinal axis.

Preferably, at takeoff, the connecting rods are contain roughly in the plane of the connecting arms not containing the longitudinal axis, in order to prevent the radial arms flexing in the direction of their least inertia.

Advantageously, the first and second adjustment mechanisms are according to the present invention, and comprise a common linear actuator formed by a hydraulic double-acting cylinder.

The axis of the linear actuator is preferably aligned with the longitudinal axis. In an example embodiment the linear actuator rotates at the same speed as one of the propellers, and the transmission of the linear actuation to the mechanism for adjusting the other propeller is then accomplished by means of rolling bearings.

The system of contra-rotating propellers according to the invention may comprise a sealed case of annular shape, which is stationary in the longitudinal axis, surrounding the central ring and the synchronisation ring in sealed fashion. The rectilinear and helical grooves to guide the adjustment mechanism are advantageously formed in a base of said case. The sealed case can comprise tubes connecting in sealed fashion the external faces of the longitudinal walls of said case, where advantageously one of the ends of the tubes is closer to the longitudinal axis than the other end. These tubes are used to return oil.

Another subject-matter of the present invention is a turbomachine for an aircraft comprising a system of contra-rotating propellers according to the present invention.

BRIEF DESCRIPTION OF THE ILLUSTRATIONS

The present invention will be better understood using the description which follows and the illustrations, in which.

DETAILED ACCOUNT OF PARTICULAR EMBODIMENTS

Figure 1:
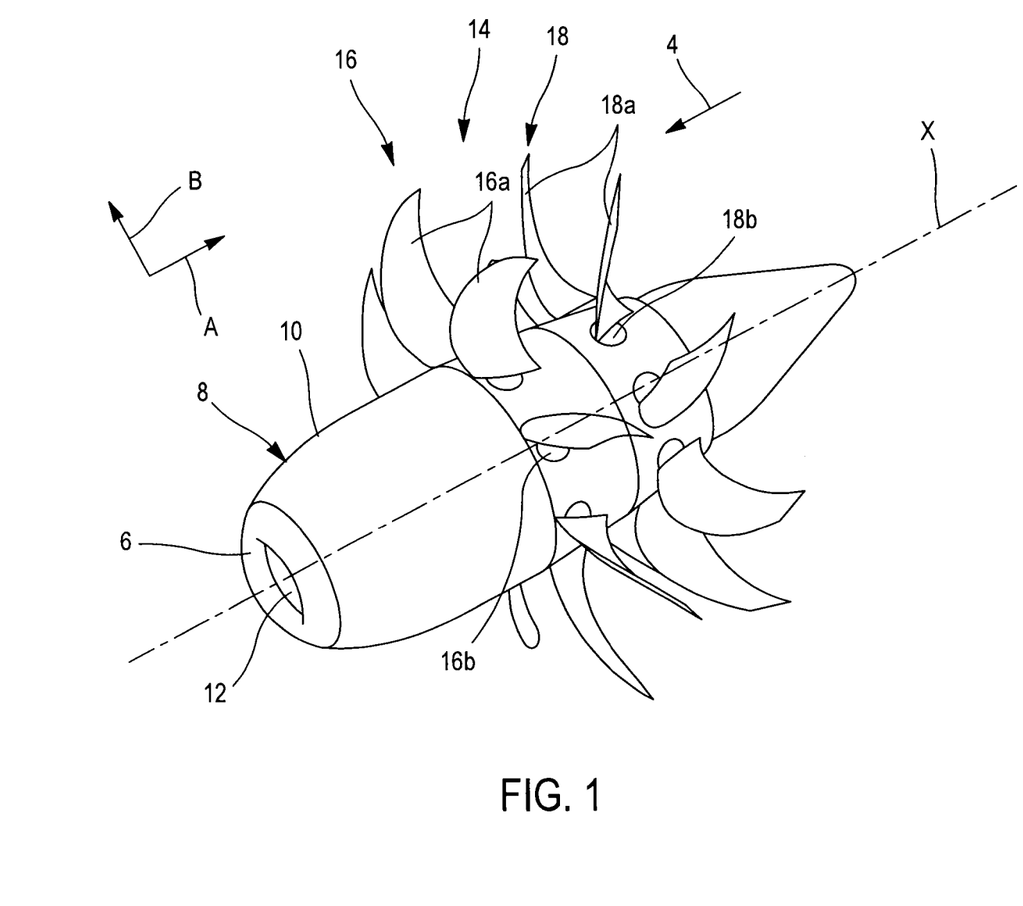
FIG. 1 is a perspective view of a turbomachine with contra-rotating propellers to which the present invention applies.

In FIG. 1 a turbomachine, of the "open rotor" type, can be seen, equipped with a system of contra-rotating propellers according to a preferred embodiment of the present invention.

In the figures direction A is the longitudinal direction or axial direction, parallel to longitudinal axis X of the turbomachine. Direction B, for its part, is the radial direction of the turbomachine. In addition, arrow 4 shows the direction of motion of the aircraft under the action of the thrust of turbomachine 1, where this motion direction is contrary to the principal outflow direction of the gases within the turbomachine. The terms "forward"/"upstream", "aft"/"downstream" used in the remainder of the description should be considered as relative to said direction of motion 4.

We shall describe, in preliminary fashion, an example of a general structure of a turbomachine with systems of contra-rotating propellers, in particular the power portion of the turbomachine which is not visible in the drawings. This description is absolutely not restrictive, and other turbomachine with a system of contra-rotating propellers comprising a power portion is not beyond the scope of the present invention.

The turbomachine has a longitudinal axis X.

In the forward part, the turbomachine has an air intake 6 which continues towards the rear through a nacelle 8, where the latter globally comprises an external skin 10 and an internal skin 12, where both these latter are centred on axis X and are offset radially one from the other.

Internal skin 12 forms an external radial casing for a gas generator comprising, in conventional fashion, from forward to aft, a low-pressure compressor, a high-pressure compressor, a combustion chamber, a high-pressure turbine and an intermediate-pressure turbine. The low-pressure compressor and the turbine are connected mechanically by a shaft, forming a low-pressure stage, whereas the high-pressure compressor and the turbine are connected mechanically by a shaft, forming a higher-pressure stage. The gas generator is thus preferably of conventional design, called a two-spool design.

Downstream from the intermediate pressure turbine (not visible) is a system of contra-rotating propellers 14.

This system comprises a free power turbine (not visible) forming a low-pressure turbine. It comprises a rotor constituting the inner portion of the turbine, together with a stator constituting the outer part of this turbine, which is connected securely to a stationary casing assembly of this system of propellers, centred on longitudinal axis X. This stator is, in a known manner, intended to be integral with the other casings of the turbomachine. In this regard, it is recommended that the system of propellers is preferably designed such that the propellers have no external radial fairing surrounding them, as can be seen in FIG. 1.

Figure 2A:
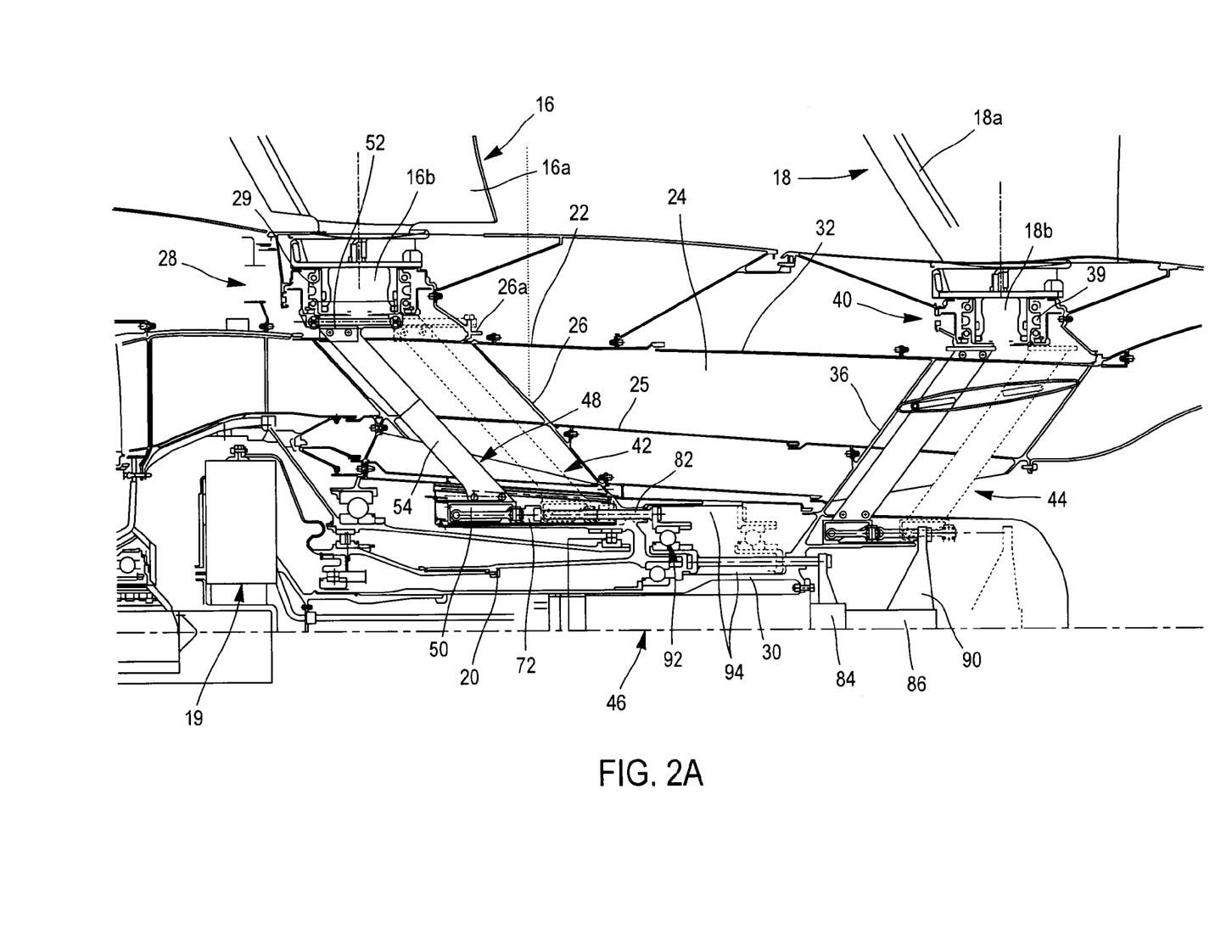
FIG. 2A represents a partial longitudinal section view of the turbomachine of FIG. 1 in the area of the variable adjustment mechanism according to the present invention in two different adjustment positions.

Downstream from the turbine the propeller system, represented as a section view in FIG. 2A, comprises a first propeller 16 or upstream propeller, to which blades 16a are attached. In analogous fashion, the system comprises a second propeller 18 or downstream propeller, supporting blades 18a. Propellers 16, 18 are thus offset relative to one another in direction 4.

Both propellers 16 and 18 are configured to rotate in opposite directions around axis X on which they are centred, and the rotations occur relative to stator 34, which remains immobile.

For the rotational drive of these two propellers 16 and 18, a mechanical transmission system 19, forming a reduction gear, of a type known to a skilled man in the art, is used.

Figure 2B:
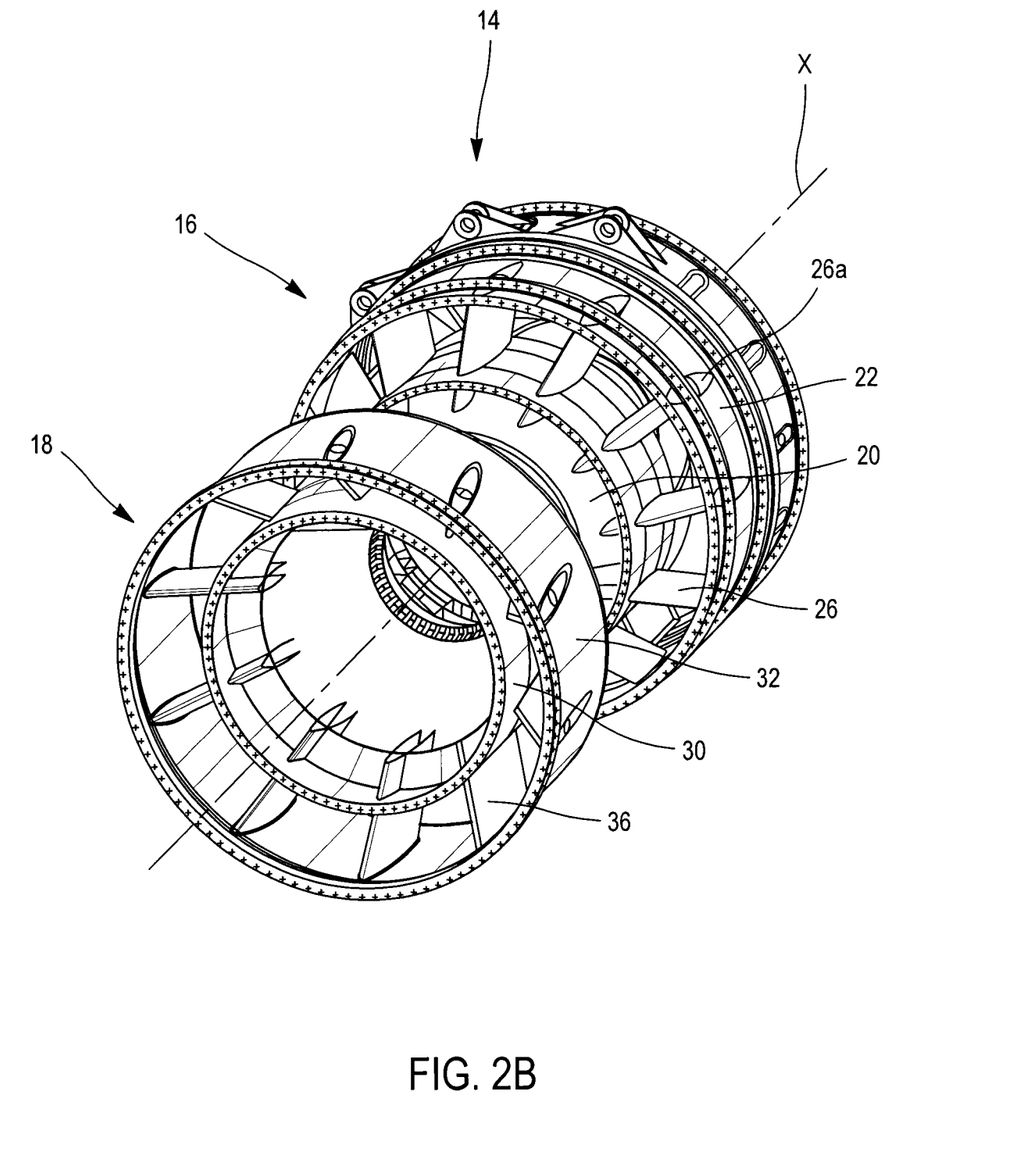
FIG. 2B represents a partial perspective view of the system of contra-rotating propellers according to the present invention.

First propeller 16 comprises a hub 20 centred on the axis of the turbine, and a radially outer ferrule 22, concentric to hub 20, and radially delimiting towards the exterior a principal annular airstream 24. Principal airstream 24 is also delimited radially towards the interior by an intermediate ferrule 25. First propeller 16 also comprises multiple connecting arms 26 distributed angularly in a regular manner around hub 20. Connecting arms 26 roughly form a star shape. The position of connecting arms 26 can be seen in FIG. 2B.

According to the present invention, connecting arms 26 are hollow.

In the represented example, connecting arms 26 are not perpendicular to longitudinal axis X but are inclined relative to the axis upstream. We shall explain the advantage of such an inclination in the remainder de la description. However, it should be noted that a system of contra-rotating propellers comprising connecting arms perpendicular to longitudinal axis X is not beyond the scope of the present invention.

Figure 3:
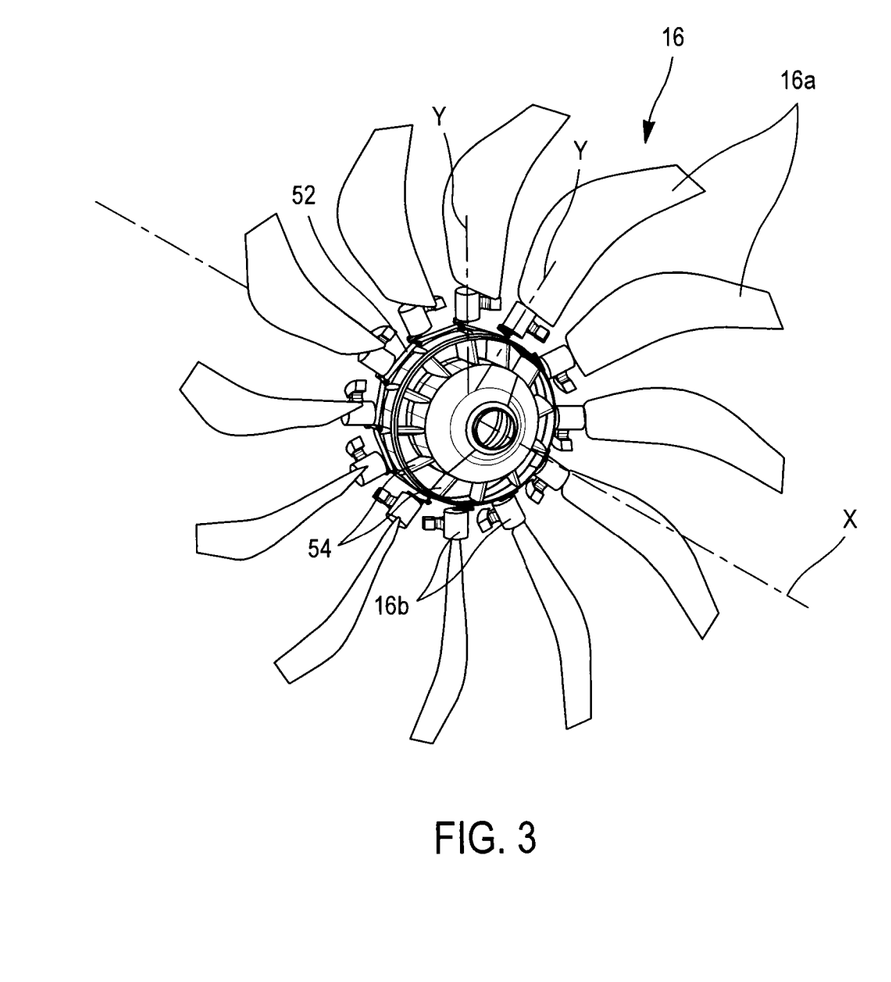
FIG. 3 represents an isolated perspective view of the casing connected to the blades of the propeller of the mechanism of FIG. 2A.

In FIG. 3 first isolated rotor 16 with the adjustment mechanism according to the invention can be seen.

Each blade 16a is installed connected around a radial direction axis Y. Each blade has a separate rotational axis; however, for purposes of simplicity we shall refer to these axes as "radial axis Y". Each blade 16a has a root 16b accommodated such that it is able to pivot in a retention ring 28 located radially outside radially outer ferrule 22; the retention ring can be seen in FIG. 2A and has been omitted from FIG. 3. In the represented example, root 16b of blade 16a is located vertically above a radially external end 26a of connecting arm 26. The purpose of the retention ring is to resist the centrifugal force exerted by blades 16a. A rolling bearing 29 is fitted in retention ring 28 to guide the rotation of blade root 16b.

Second propeller 18 comprises a hub 30 centred on axis X of the engine, and a radially outer ferrule 32, concentric to hub 30, and radially delimiting towards the exterior a principal annular airstream 24. Second propeller 18 also comprises multiple connecting arms 36 distributed angularly in a regular manner around hub 30.

In the represented example, connecting arms 36 are also inclined relative to longitudinal axis X, downstream. We shall explain the advantage of such an inclination in the remainder de la description. However, as with the first propeller, it should be noted that a system of contra-rotating propellers comprising connecting arms 36 perpendicular to longitudinal axis X is not beyond the scope of the present invention.

Each blade 18a is installed connected around an axis extending radially. Each blade 18a comprises a root 18b accommodated such that it is able to pivot in a retention ring 40 located radially outside radially outer ferrule 32. In the represented example, root 18b of blade 18a is located vertically above a radially external end 36a of connecting arm 36. A rolling bearing 39 is fitted in retention ring 40 to guide the rotation of blade root 18b. The position of connecting arms 36 can be seen in FIG. 2B.

System of contra-rotating propellers 14 according to the present invention also comprises a first variable adjustment mechanism 42 for adjusting the pitch of blades 16a of first propeller 16 and a second variable adjustment mechanism 44 for adjusting the pitch of blades 18a of second propeller 18.

In the description which follows, both adjustment mechanisms 42, 44 are advantageously similar. However, a system of contra-rotating propellers comprising a mechanism according to the invention and another mechanism, for example known in the state of the art, is not beyond the scope of the present invention.

For purposes of simplicity we shall describe in detail first adjustment mechanism 42, where the description applies to second adjustment mechanism 44.

First adjustment mechanism 42 comprises a linear actuator 46, a bracket 48 connecting the actuator and root 16b of one or more blades 16a.

In the represented example, linear actuator 46 is formed by a hydraulic cylinder located in longitudinal axis X.

Figure 4:
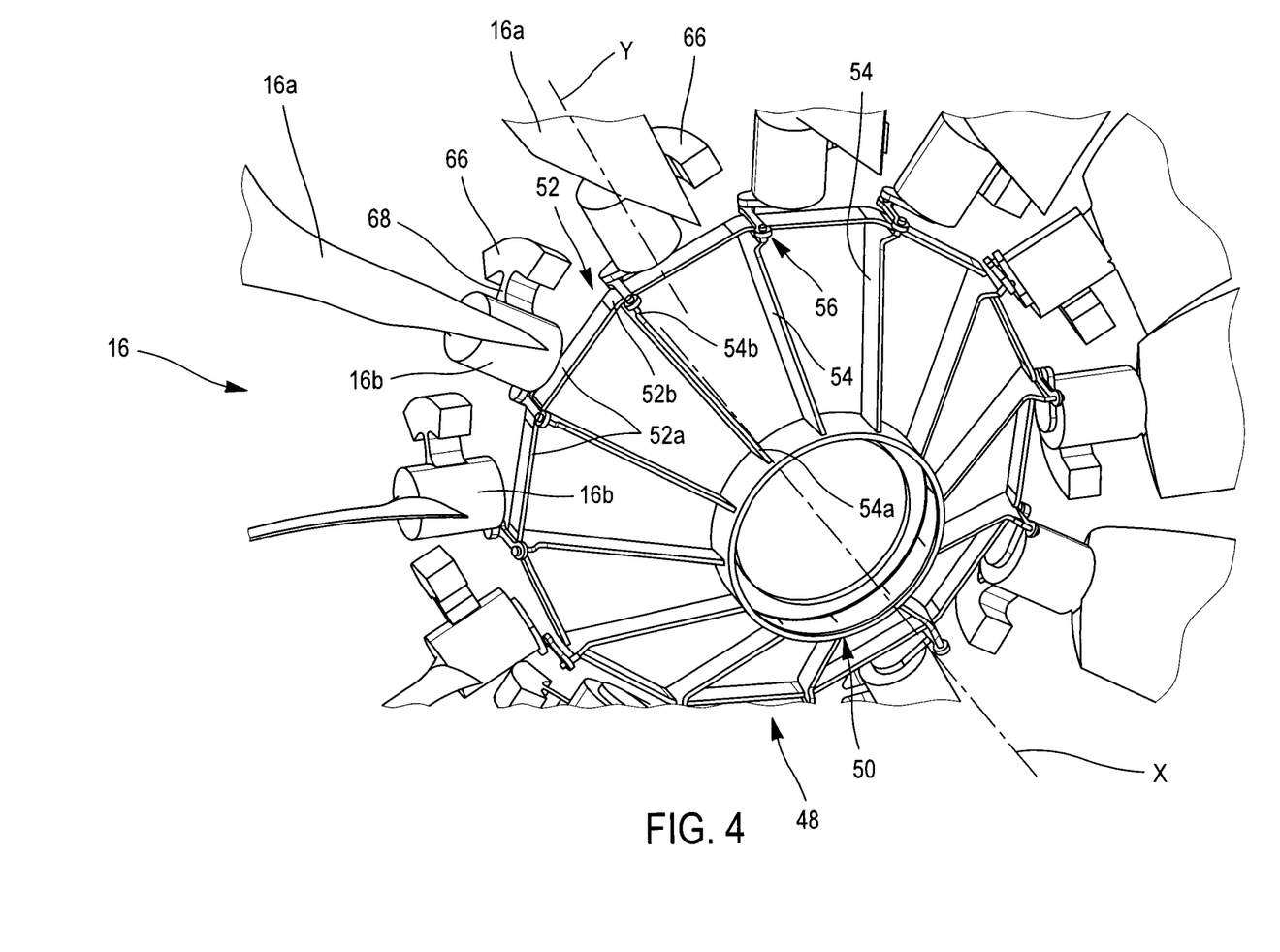
FIG. 4 is a representation of the assembly represented in FIG. 3 from which a casing supporting the propeller has been removed.

Bracket 48, which is particularly visible in FIG. 4, comprises a central ring 50, an outer ring 52 concentric to central ring 50, and radial arms 54 extending between central ring 50 and outer ring 52. Radial arms 54 are rigidly attached to central ring 50 and to outer ring 52 by their radially internal ends 54a and radially external ends 54b respectively, for example by welding or by bolting, which facilitates installation and removal operations.

Central ring 50 is positioned between hub 20 and intermediate ferrule 25, the outer ring is positioned outside radially outer ferrule 22, and radial arms 54 extend within hollow connecting arms 26. Radially external end 54b of each radial arm 54 emerging from connecting arm 26 at some distance from longitudinal axis X, and radially internal end 54b of each radial arm 54 emerging from connecting arm 26 towards longitudinal axis X.

Radial arms 54 of the bracket pass through the gas stream, and the connecting arms form fairings. The impact on the flow of the presence of radial arms 54 in airstream 24 is then reduced.

According to the present invention, central ring 50, radial arms 54 and outer ring 52 are positioned so as to form a rigid structure having the shape of a truncated cone; this shape lends increased rigidity to bracket 48. In the represented example, since the arms of connections 24 are inclined upstream and themselves form a truncated cone shape, the taper of bracket 48 and that of the structure formed by radial arms 54 have the same alignment.

It is recalled that such a truncated cone bracket which moves in connecting arms, which are perpendicularly aligned with longitudinal axis X, does not go beyond the scope of the present invention.

In a particularly advantageous manner, outer ring 52 consists of straight segments 52a extending between two radially external ends 54b of radial arms 54. This polygonal shape enables the rigidity of bracket 48 to be increased further.

Figure 6:
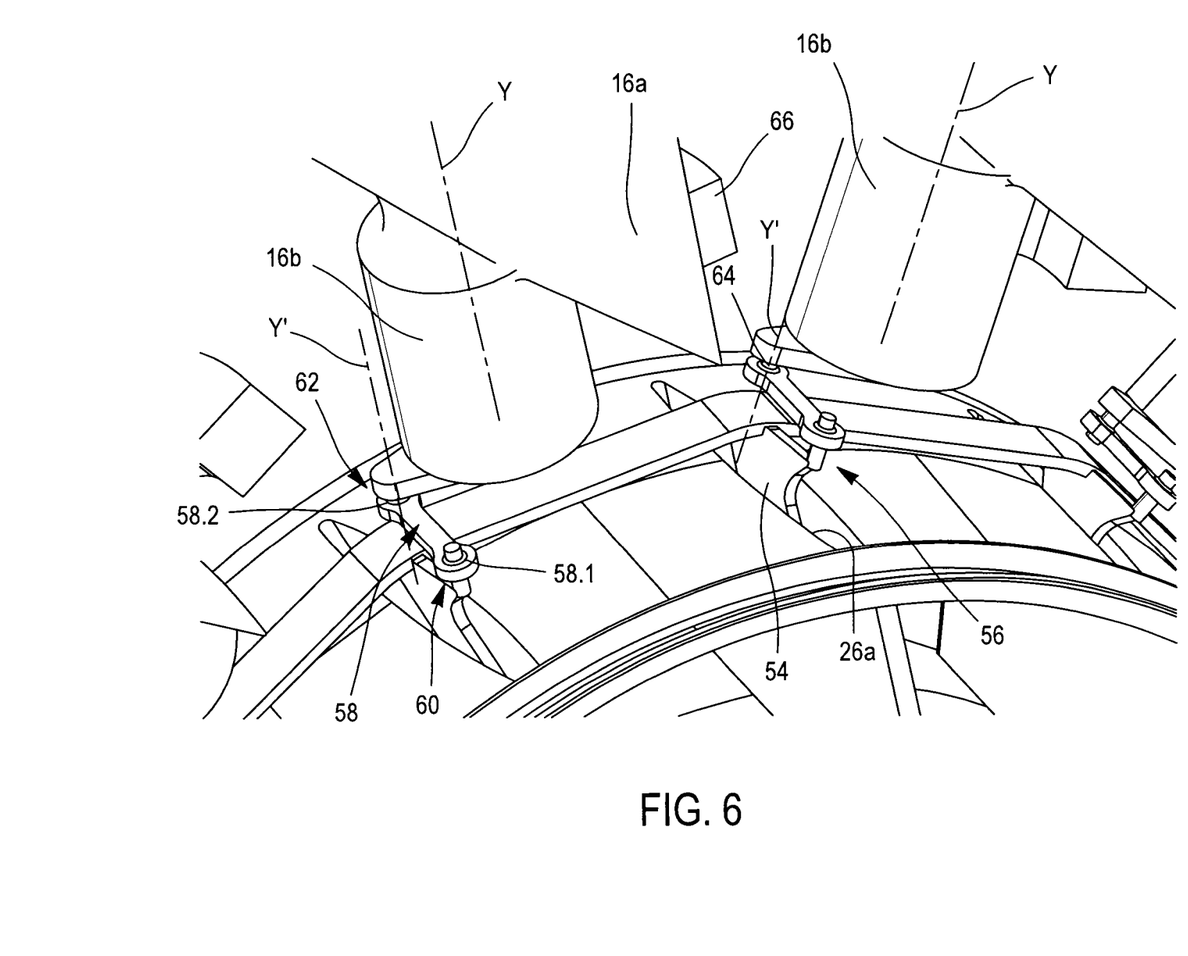
FIG. 6 represents an enlarged view of FIG. 5 showing an example embodiment of means to transform the translational movement of the bracket into rotary motion of the blades.

In the represented example, straight segments 52a of outer ring 52 are formed from a single piece, for example by bending a strip of metal or metal alloy. In addition, radially external ends 54b of radial arms 54 comprise a notch which accommodates the radially internal face of a connecting portion 52b between two straight segments 52a, as can be seen in FIG. 6.

Advantageously, bracket 48 has as many radial arms 54 as there are blades and connecting arms 26. Thus, each radial arm 54 of bracket 48 is intended to rotate by the space of one blade 16a. Each blade has equal stiffness in torsion; by this means satisfactory synchronisation is obtained between the movements of all the blades.

Figure 5:
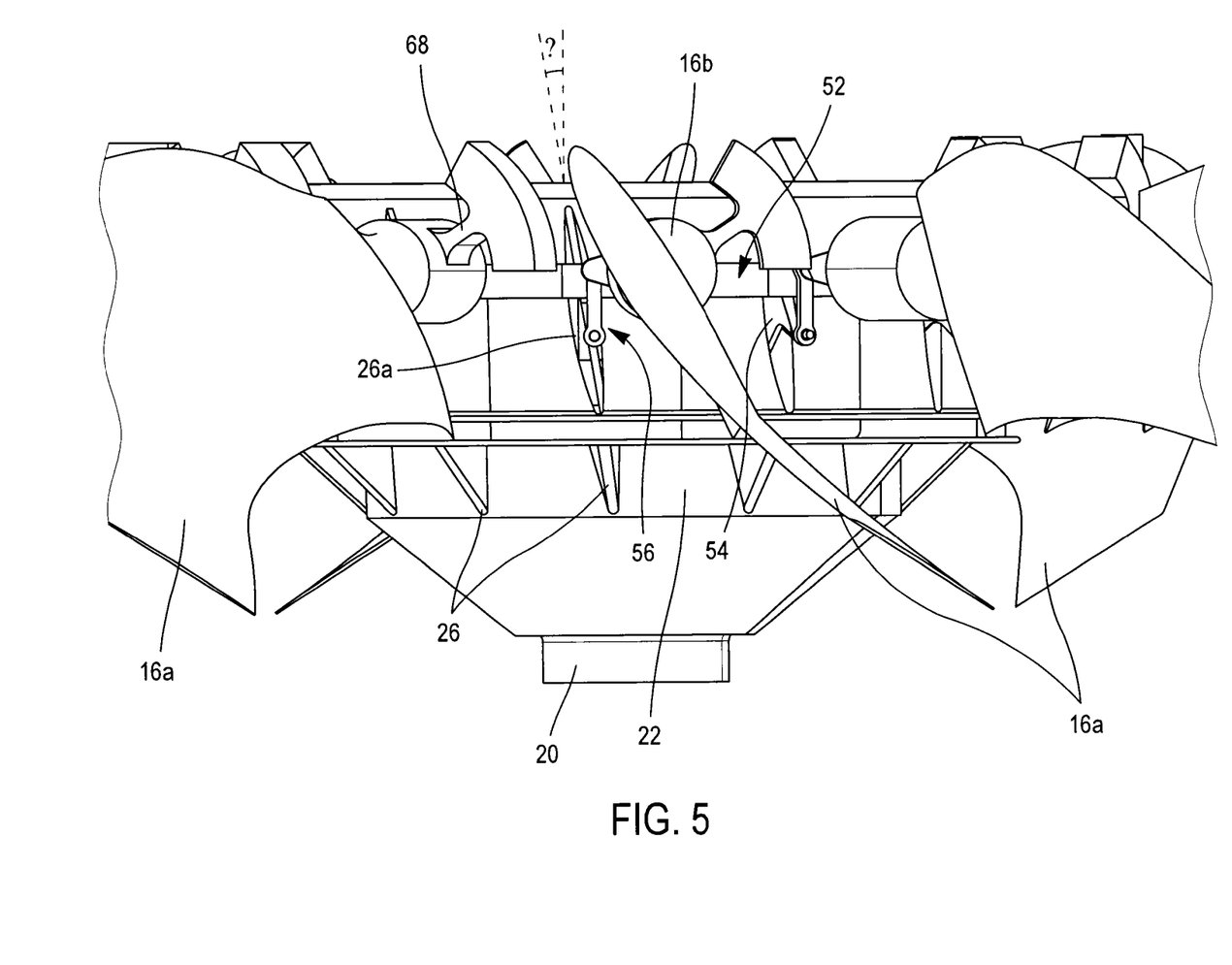
FIG. 5 represents a view of the assembly represented in FIG. 4 from a radially external point, where the ferrules and the connecting arms have been added.

As can be seen in FIG. 5, the section of cavities 26a of hollow connecting arms 26 is roughly elliptical in shape. The largest dimension of the section of each cavity is chosen such that the movement of radial arms 54 enables the adjustment angle of blades 16a to vary by approximately 120°.

First variable adjustment mechanism 42 also comprises means 56 to convert the translational movement of bracket 48 into rotary motion of blades 16a around their radial axis Y. An example of such conversion means 56 can be seen in FIGS. 5 and 6. Means 56 comprise a connecting rod 58 connected by a first longitudinal end 58.1 to the end of a radial arm 54 by means of a ball-and-socket joint 60 and by a second longitudinal end 58.2 to root 16b of a blade 16a by a pivot linkage 62 of axis Y' roughly parallel to axis of rotation Y of blade 16a and different to the latter. In the represented example a pin 64 attached under root 16b is accommodated in a bore of connecting rod 58 and forms the axis of the pivot. Pin 64 is offset relative to axis Y.

It is clearly understood that every other means of conversion of the translational movement into rotary motion can be used. For example, this may involve a groove formed in the outer ring, and in which pin 64 is accommodated. The mechanism for adjusting the pitch or the angle of alignment of the blades plays a critical role in regulating the speed of rotation of the propellers. As a consequence, precautions are taken to prevent a condition of overspeed of the propellers if one of the components of the pitch-change mechanism fails. The centrifugal force and the distribution of the mass of the blade cause a torque which tends to align the blade perpendicularly to longitudinal axis X, called "fine pitch" by the skilled man in the art. In this case the propeller is self-driven by the speed of the aircraft, which could lead to a condition of rotary overspeed.

To prevent this condition, each blade 16a is advantageously equipped with a counterweight 66, as can be seen in FIGS. 3 and 5, which generates a torque which is opposed to the inertial torque of blade 16a, and which tends to pull blade 16a towards the feathered position, i.e. parallel to longitudinal axis X, and in which it helps to slow the propeller. In the represented example, counterweight 66 has roughly the shape of a part delimited between two concentric arc segments.

Counterweight 66 is attached to root 16b of blade 16a radially outside the latter relative to axis Y by means of a radial arm 68 relative to axis Y.

If the adjustment mechanism for one or more blades fails, the blade or blades concerned 16a naturally become feathered, which puts propeller 16 in a satisfactory condition to stop the engine in perfect safety. Every other system which generates a torque to return the blades to the feathered position is also applicable.

Figure 8:
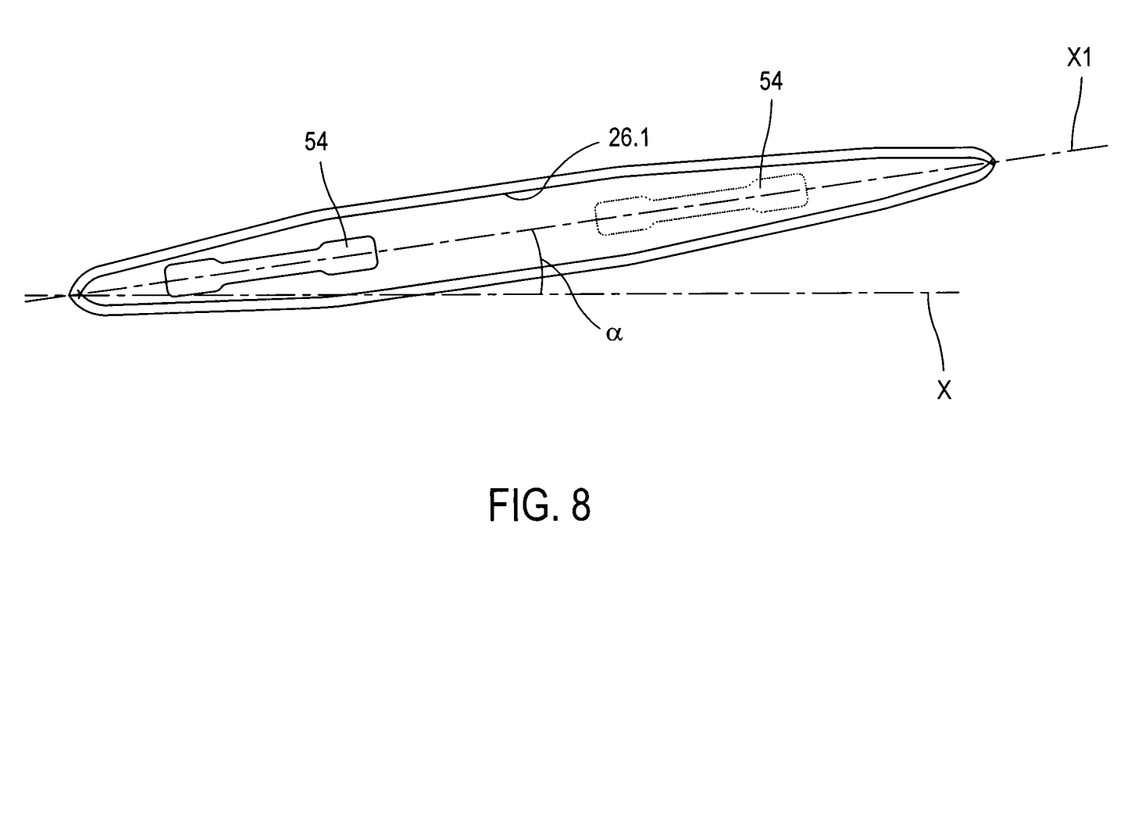
FIG. 8 represents the two end positions of a radial arm of the bracket in a connecting arm.

In the represented example, which is a particularly advantageous example of the invention, the contra-rotating propeller system comprises connecting arms 26 aligned such that they are aligned with the airstream resulting from the rotation of propeller 16 and the flow which exits the engine axially. This inclination enables the drag caused by their presence in the gas stream to be reduced. To this end, axis X1, with which the direction of greatest length of the section of each connecting arm 26 is aligned, is not parallel to the axis of the engine, but is inclined relative to the latter, as can be seen in FIG. 8.

Figure 7:
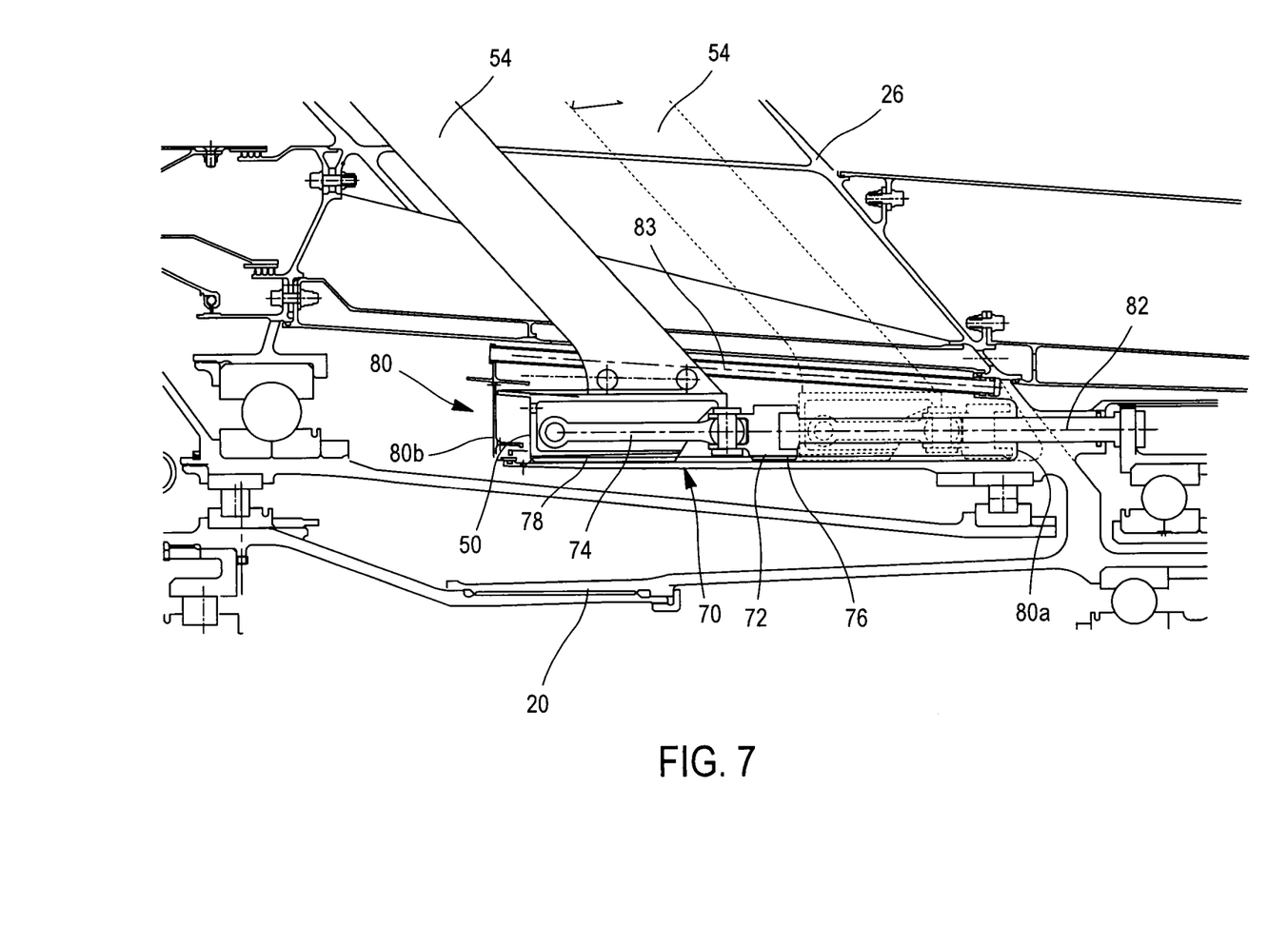
FIG. 7 represents a detailed view of FIG. 2 in the area of the radially internal end of the radial arms of the bracket of the mechanism according to the present invention in two adjustment positions.

Adjustment mechanism 42 according to the present invention then comprises, for this advantageous example, guide means 70, represented in FIG. 7, enabling radial arms 54 of the bracket to follow this inclination of connecting arms 26.

The guide means are particularly visible in the enlarged view represented in FIG. 7. Bracket 48, which adjusts the pitch of the blades, is then not only moved with a translational movement, but is also simultaneously moved in rotary fashion, thus describing a helical motion around longitudinal axis X.

In the example represented in FIG. 7, guide means 70 comprise a synchronisation ring 72 and connecting rods 74 which are connected firstly to synchronisation ring 72, and also to central ring 50. In addition, guide means 70 comprise at least one rectilinear groove 76 parallel to axis X and at least one helical groove 78. Grooves 76, 78 are, for example, made, in a particular advantageous manner, in the base of a sealed case 80, which we shall describe in detail in the remainder of the description.

It is clearly understood that every other surface could be suitable to make guide grooves 76, 78.

The pitch of the helical groove is such that it is equal to the inclination of axis X1 of the section of the connecting arm relative to longitudinal axis X.

Advantageously, guide means 70 comprise multiple rectilinear grooves 76 and inserted helical grooves 78, distributed angularly in uniform fashion in the base of case 80 around longitudinal axis X. Multiple grooves 76, 78 guide the retention ring and central ring 50 uniformly around longitudinal axis X.

As can be seen in FIG. 7, synchronisation ring 72 is attached directly to the ends of multiple transmitting rods able to move with translational movement, 82, which are themselves imparted with motion by linear actuator 46. Synchronisation ring 72 is guided with a translational movement by rectilinear groove 76; to do so it slides in rectilinear groove 76.

Central ring 50 is imparted with motion by the synchronisation ring 72 via connecting rods 74, and slides in helical grooves 78; the bracket therefore describes a helical motion around axis X, together with radial arms 54, which can then adopt the inclination of hollow connecting arms 24. In FIG. 8 the inclination of a connecting arm relative to the axis of engine X can be seen, together with the extreme positions adopted by a radial arm 54. It can be seen that radial arm 54 adopts the inclination of the connecting arm.

It is clearly understood that the grooves could be made in central ring 50.

As an example, angle a between axis X and axis X1 according to the largest length of the section of a connecting arm is of the order of 8°.

Advantageously, a sealed case 80 is comprised, represented in FIG. 7, around the radially internal ends of radial arms 54, so as to prevent oil leaks in the connecting arms. For example, this case 80 has an annular shape, and extends axially so as to confine radially internal ends 54a of all radial arms 54 and central ring 50 along their entire trajectory.

Transmitting rods 82 traverse a longitudinal wall of case 80 in sealed fashion, for example due to the presence of O-rings.

Case 80 advantageously avoids the use of dynamic seals, which would have to be located around the radial arms, and the efficiency of which can diminish over time. Due to case 80, tightness is accomplished in static fashion, and only the relatively simple dynamic seal of transmitting rods 82 is to be accomplished.

In addition, advantageously, case 80 is traversed axially by tubes 83 connecting in sealed fashion both outer faces of both longitudinal walls 80a, 80b of the case, allowing the return of the oil which has been centrifuged on the outer wall of the enclosure, without this oil penetrating the interior of the case. The enclosure is formed by the volume delimited by the double wall represented in FIG. 2A. Longitudinal tubes 83 are preferably inclined, and their downstream end is preferably closer to axis X than their upstream end.

We shall now describe the actuation of the two adjustment mechanisms 42, 44.

As mentioned above, mechanisms 42, 44 are preferably similar structures in accordance with the present invention. Each mechanism 42, 44 therefore consequently comprises a linear actuator.

Advantageously, as represented in FIG. 2A, a single actuator 46 is used for both mechanisms 42, 44 formed by a double-acting cylinder with axis X.

Control cylinder 46 is advantageously located in longitudinal axis X, enabling all the seals rotating at high pressure over a small diameter to be available; sealing is then easier to accomplish, risks of leaks in the seals are diminished, and the lifetime of the seals is increased.

It is recalled that the propellers are rotated in opposite directions, and that each adjustment mechanism 42, 44 rotates at the same speed as its propeller 16, 18.

In the represented example, double-acting cylinder 46 rotates at the speed of second propeller 18. The double-acting cylinder comprises a first cylinder rod 84 to actuate first adjustment mechanism 42 of first propeller 16, and a second cylinder rod 86, concentric to first cylinder rod 84, to actuate second adjustment mechanism 44 of second propeller 18.

Since double-acting cylinder 46 rotates at the same speed as second propeller 18, actuation of second mechanism 44 is obtained by an almost-direct connection between second cylinder rod 86 and the transmitting rod connected to the synchronisation ring of the second adjustment mechanism; only a idler arm 90 is used to connect second cylinder rod 86 to the rod connected to the synchronisation ring.

As regards first adjustment mechanism 42, it does not rotate in the same direction as second rod 86. Rolling bearings 92 are then comprised to transmit the translational movement of first rod 86 of the rotating frame of double-acting cylinder 46 and of second propeller 18 to that of first propeller 16. The rotary motion of rolling bearings 92 is stopped in the frame of the double-acting cylinder, for example by means of fluting 94.

In FIGS. 9A to 9D, different positions adopted by a blade 16a can be seen, together with the positions adopted by the associated connecting rod.

Figure 9A:
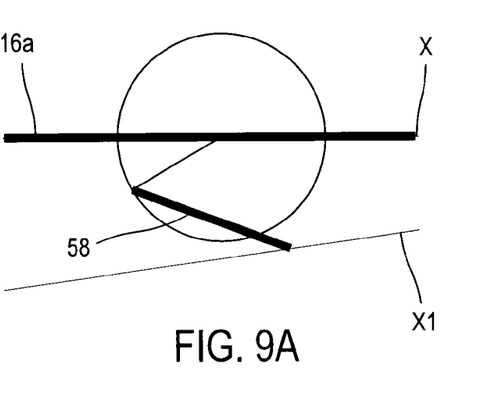
FIGS. 9A to 9D are schematic representations of different angular positions which can be adopted by a blade, and those of its associated connecting rod.
Figure 9B:
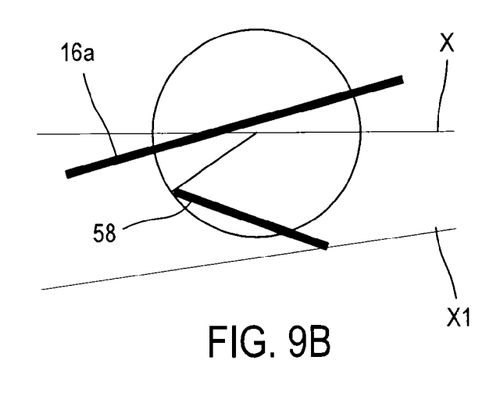
Figure 9C:
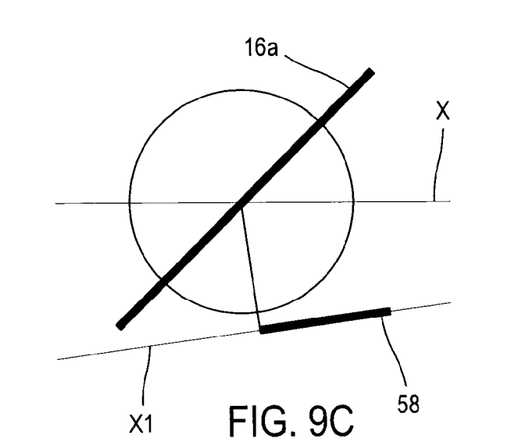

In FIG. 9A, blade 16a is in a feathered position.
In FIG. 9B, blade 16a is in a "slow" position.
In FIG. 9C, blade 16a is in a "takeoff" position.

In a particularly advantageous manner, the axis of connecting rod 58 is in an aircraft takeoff position roughly parallel to axis X1 of the profile of the rotor arm, as can be seen in FIG. 9C, which enables radial arms 54 to be prevented from flexing in the direction of their smallest inertia during takeoffs, at which times the forces are greatest.

Figure 9D:
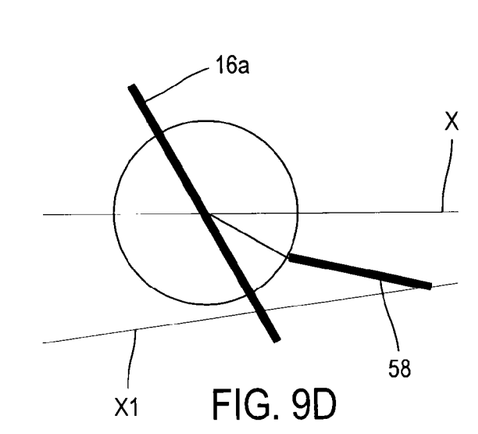

In FIG. 9D, blade 16a is in a "reverse" position after landing, to generate a reverse thrust in order to slow the aircraft.

We shall now explain the operation of first mechanism 42 to adjust propeller 16 using FIG. 2A; the explanation also applies to second adjustment mechanism 44.

When it is desired to modify the angular alignment of blades 16a of first propeller 16 the hydraulic cylinder is actuated; the actuation of cylinder 46 causes the translational movement of first cylinder rod 84; its direction of movement and the amplitude of movement depend on the desired rotational direction of the blades, and on the desired angle of rotation. Cylinder rod 84 causes a translational movement of rods 82 via rolling bearings 92. The sliding of rods 82 causes a movement of synchronisation ring 72, which also slides axially, guided by rectilinear grooves 76, as is represented in FIG. 7.

Via connecting rods 74, central ring 50 is also moved along axis X, and around axis X, since it is guided by helical grooves 78. Central ring 50 then describes a helical motion, together with radial arms and outer ring 52 which forms bracket 48. The translational movement of radial arms 54 causes, via connecting rods 58, a rotation of roots 16b of blades 16a of propeller 16 around their axis Y.

All blades 16a of propeller 16 pivot simultaneously and in the same direction, such that at the end of the adjustment blades 16a have the same angular alignment relative to axis X.

If the adjustment mechanism fails for all the blades, or only for some blades, for example due to a breakage of some of connecting rods 58, counterweights 66 (which can be seen in FIGS. 3 and 5) automatically cause the blades concerned to be feathered.

As is represented in FIG. 2A, cylinder 46 simultaneously causes blades 18a of second propeller 18 to be adjusted using a similar operating procedure.

It may be envisaged that the alignment of the blades of the first propeller is different to that of the second propeller, which for example enables one propeller to be accelerated or decelerated relative to the other, and thus enables the rotary speed ratio between the propellers to be regulated.

As has been previously described, the connecting arms are advantageously inclined relative to longitudinal axis X in the upstream direction in respect of those extending radially between hub 22 and the radially outer ferrule of first propeller 16, and in the downstream direction in respect of those extending radially between hub 32 and radially outer ferrule 34 of second propeller 18. This inclination enables connecting arms 26 to be moved closer to the casing positioned between the free power turbine and the propeller system, moving radially towards the exterior, which globally enables blades 16a to be moved closer to the casing. This results in a reduction of the length of the propeller system in the axial direction. Gains in terms of mass and encumbrance are obtained in this manner.

As can be seen in FIG. 2A, the angle between the arms and the longitudinal axis can be between 20° and 50°, but every other alignment can be envisaged, and the inclinations chosen for the connecting arms depend on the desired separation between blades 16a, 18a in the longitudinal direction, notably in order to satisfy acoustic constraints. As a variant, it is possible to envisage inclining connecting arms 26 in an upstream direction, together with connecting arms 36.

Due to the mechanism according to the present invention there is a smaller number of parts compared to the mechanisms of the prior art, improving the mechanism's reliability, and enabling the mechanism's construction cost to be reduced. The increased rigidity of the bracket improves the accuracy with which the angle of adjustment of the propeller blade can be adjusted. In addition, the brackets are greatly open-worked to enable the gas flow to pass within the engine, and they thus cause little obstruction to this flow. Finally, due to the adjustment mechanism according to the invention, a uniform adjustment of all the blades is obtained through the use of revolving parts to synchronise the connecting rods.

The invention is applicable to all turbomachines, and particularly those known as "open rotor" turbomachines. In the latter case the invention applies whether the propeller system is positioned upstream or downstream from the gas generator. In both these cases, within the propeller system, it can be envisaged to position the power turbine upstream or downstream from the contra-rotating propellers.

The bracket is made, for example, of titanium.

In another embodiment, it could be envisaged for the radial arms of the adjustment mechanisms not to be positioned in the connecting arms, but outside them.

The invention claimed is:

1. An adjustment mechanism for adjusting pitch of blades of at least one propeller of a system of contra-rotating propellers for a turbomachine in which each blade is configured to move around a radial axis, comprising:
   a linear actuator; and
   a device to convert movement imparted by the linear actuator into rotation of each of the blades in a synchronized manner around their radial axis, the device comprising a bracket of longitudinal axis formed of a central ring, an outer ring, and multiple radial arms rigidly connected to the central ring and to the outer ring, the radial arms traversing a principal annular airstream of the system of contra-rotating propellers, the central ring configured to be subject to actuation of the linear actuator, the central ring and the outer ring being positioned in two separate planes, orthogonal to the longitudinal axis, such that the radial arms are inclined relative to the longitudinal axis, and the bracket being shaped as a truncated cone.

2. An adjustment mechanism according to claim 1, in which the outer ring is polygonal in shape.

3. An adjustment mechanism according to claim 2, in which the outer ring is formed from multiple straight segments, each extending between two radially external ends of two consecutive radial arms.

4. An adjustment mechanism according to claim 1, in which the device to convert the movement of the linear actuator into the rotation of each of the blades further comprises connecting rods connected between the bracket and each blade, connection between the connecting rod and the blade being a pivot linkage of axis parallel to the radial axis of rotation of the blade, but different to the radial axis.

5. A system of contra-rotating propellers for aircraft turbomachine, comprising:
   a free power turbine;
   a contra-rotating first blade and second blade, configured to rotate around a longitudinal axis of the system of propellers, wherein a first propeller is located in a given direction relative to a second propeller, wherein each of the first and second propellers comprises a hub centered on the longitudinal axis, and wherein an outer ferrule is positioned concentrically relative to the hub, and contributes to radial delimitation towards an outside of a principal annular airstream, together with connecting arms connecting the outer ferrule to the hub;
   a mechanical transmission device driven by the free power turbine and driving the first and second propellers;
   a first adjustment mechanism for adjusting pitch of the blades of a first turbine, and a second adjustment mechanism for adjusting pitch of the blades of a second turbine, at least one of the first and second adjustment mechanisms comprising a linear actuator and a device to convert movement imparted by the linear actuator into rotation of each of the blades in a synchronized manner around their radial axis, the device comprising a bracket of longitudinal axis formed of a central ring, an outer ring, and multiple radial arms rigidly connected to the central ring and to the outer ring, the radial arms traversing a principal annular airstream of the system of contra-rotating propellers, the central ring configured to be subject to actuation of the linear actuator, the central ring and the outer ring being positioned in two separate planes, orthogonal to the longitudinal axis, such that the radial arms are inclined relative to the longitudinal axis, and the bracket being shaped like a truncated cone.

6. A system of contra-rotating propellers according to claim 5, in which the connecting arms are hollow and the radial arms are housed in the connecting arms.

7. A system of contra-rotating propellers according to claim 6, in which the bracket includes as many radial arms as there are blades, and wherein each radial arm is accommodated in a connecting arm.

8. A system of contra-rotating propellers according to claim 7, in which the connecting arms are contained in planes that do not contain the longitudinal axis, such that the connecting arms are aligned with a flow of the gas in the principal airstream, and wherein the at least one of the first and second adjustment mechanisms comprises a guide for the bracket, such that it describes a helical motion around the longitudinal axis.

9. A system of contra-rotating propellers according to claim 8, in which the at least one of the first and second mechanisms comprises a synchronization ring connected to the inner ring of the bracket by multiple connecting rods, and the guide comprises multiple rectilinear grooves parallel to the longitudinal axis, to guide the synchronization ring, and multiple helical grooves, to guide the central ring.

10. A system of contra-rotating propellers according to claim 5, in which the connecting arms of the first propeller and the connecting arms of the second propeller extend radially in planes containing the longitudinal axis, in directions inclined relative to the longitudinal axis.

11. A system of contra-rotating propellers according to claim 5, in which the device to convert the movement of the linear actuator into the rotation of each of the blades further comprises connecting rods connected between the bracket and each blade, the connection between the connecting rod and the blade being a pivot linkage of axis parallel to the radial axis of rotation of the blade, but different to the radial axis the connecting arms are contained in planes that do not contain the longitudinal axis, such that the connecting arms are aligned with the flow of the gas in the principal airstream, and wherein the at least one of the first and second adjustment mechanisms comprises a guide of the bracket, such that it describes a helical motion around the longitudinal axis and in which, at takeoff, the connecting rods of the device to convert translational movement into rotary motion are contained roughly in the plane of the connecting arms not containing the longitudinal axis.

12. A system of contra-rotating propellers according to claim 5, in which the first and second adjustment mechanisms comprise a linear actuator, and a device to convert the movement imparted by the linear actuator into the rotation of each of the blades in a synchronized manner around their radial axis, the device comprising a bracket of longitudinal axis formed of a central ring, an outer ring, and multiple radial arms rigidly connected to the central ring and to the outer ring, the radial arms traversing a principal annular airstream of the system of contra-rotating propellers, the central ring configured to be subject to actuation of the linear actuator, the central ring and the outer ring being positioned in two separate planes, orthogonal to the longitudinal axis, such that the radial arms are inclined relative to the longitudinal axis, and the bracket being shaped like a truncated cone, the system further comprising a common linear actuator, the actuator rotates at a same speed as one of the propellers, and the transmission of the linear actuation to the adjustment mechanism of the other propeller is accomplished by rolling bearings.

13. A system of contra-rotating propellers according to claim 5, in which the at least one of the first and second adjustment mechanisms comprises a synchronization ring connected to the inner ring of the bracket by multiple connecting rods, and the guide comprises multiple rectilinear grooves parallel to the longitudinal axis, to guide the synchronization ring, and multiple helical grooves, to guide the central ring, the system further comprising a sealed case of annular shape, which is stationary in the longitudinal axis, surrounding in sealed fashion the central ring and the synchronization ring.

14. A system of contra-rotating propellers according to claim 13, in which the rectilinear grooves and helical grooves are formed in a base of the case.

15. A system of contra-rotating propellers according to claim 13, further comprising tubes connecting in sealed fashion outer faces of the longitudinal walls of the case, wherein one of the ends of the tubes is closer to the longitudinal axis than the other end.

16. A turbomachine for an aircraft comprising a system of contra-rotating propellers, comprising:

a free power turbine;

a contra-rotating first blade and second blade, configured to be made to rotate around a longitudinal axis of the system of propellers, wherein a first propeller is located in a given direction relative to a second propeller, wherein each of the first and second propellers comprises a hub centered on the longitudinal axis, and wherein an outer ferrule is positioned concentrically relative to the hub, and contributes to radial delimitation towards an outside of a principal annular airstream, together with connecting arms connecting the outer ferrule to the hub;

a mechanical transmission device driven by the free power turbine and driving the first and second propellers;

a first adjustment mechanism for adjusting pitch of the blades of a first turbine, and a second adjustment mechanism for adjusting pitch of the blades of a second turbine, at least one of the first and second adjustment mechanisms comprising a linear actuator and a device to convert movement imparted by the linear actuator into rotation of each of the blades in a synchronized manner around their radial axis, the device comprising a bracket of longitudinal axis formed of a central ring, an outer ring, and multiple radial arms rigidly connected to the central ring and to the outer ring, the radial arms traversing a principal annular airstream of the contra-rotating propellers, the central ring configured to be subject to actuation of the linear actuator, the central ring and the outer ring being positioned in two separate planes, orthogonal to the longitudinal axis, such that the radial arms are inclined relative to the longitudinal axis, and the bracket being shaped like a truncated cone.

* * * * *